Oct. 30, 1928.                    1,690,034
W. NOBLE
VARIABLE PROPELLER
Filed April 27, 1927    6 Sheets-Sheet 5

Fig. 8.

Patented Oct. 30, 1928.

1,690,034

UNITED STATES PATENT OFFICE.

WARREN NOBLE, OF DETROIT, MICHIGAN.

VARIABLE PROPELLER.

Application filed April 27, 1927. Serial No. 187,048.

This invention relates to aircraft propellers, and more particularly to variable propellers wherein the pitch of the blades may be altered from time to time to suit different conditions of operation.

The general idea of varying the pitch of the blades of an airplane propeller is not broadly new, as it has long been recognized that efficient propeller operation under all conditions of flight required a change of pitch, and it has been suggested in the past to provide gearing and operating means for effecting such change of pitch, but such gearing and operating means have not been of such a nature as to, in themselves, solve the problem of rotating the blades on their radial axes effectively under actual operating conditions.

It will be recognized that, by means of gearing, the propeller blades may be rotated in their hubs without great difficulty when the propeller is at rest, as, this involving a quite common mechanical motion; but it will also be apparent that the problem of rotating propeller blades when the propeller is operating at high speed involves much more than the mere mechanical motion referred to, but calls for the provision of means for overcoming of the binding effect or thrust which centrifugal force sets up between the shoulder of the blades and the complementary surfaces of the hub, which thrust increases by the square of the propeller speed.

None of the arrangements heretofore suggested for the varying of the pitch of variable propellers appear to have taken proper cognizance of this centrifugal factor, other than to provide ball or other so-called antifriction thrust bearings, and no means have been suggested for bringing into effect forces tending to overcome the binding effect of centrifugal force and thereby facilitate a rotary movement of the blades in the required manner.

It is, therefore, the principal object of this invention to provide in a variable propeller for the application of a force to the propeller blades opposite in sense to the centrifugal force set up when the propeller is in operation, and auxiliary means operating to produce rotary movement of the blades on their own axes, when the effect of the centrifugal force is so relieved.

Further objects are to provide means for exerting separating pressure on opposed shoulders of a propeller hub and propeller blade bosses mounted therein, to relieve friction between the surfaces resulting from the effect of centrifugal force set up in the blades of the propeller under operating conditions, and to provide for the utilizing of said surface separating means as a step in process of rotating the propeller blades for purposes of varying the pitch thereof.

Still further it is an object of this invention to provide, in combination with propeller blade-rotating mechanism for effecting the variation of blade pitch, hydraulic pressure-distributing means operating against the propeller blades, and against the structure in which said blades are mounted, in opposite directions to relieve centrifugally-effected binding therebetween; and means for applying requisite pressure to said hydraulic means. The invention also contemplates the operation of said power applying means by utilizing the rotation of the propeller structure or the shaft upon which the propeller is mounted.

Still further objects of the invention are to provide for the separating of thrust faces of the propeller blades and their mounting to a predetermined extent during propeller operation, when required, to facilitate blade pitch variation, and also to provide, in connection with hydraulic separation of such surfaces, valving means automatically operated, upon separation taking place to a predetermined extent, to relieve excessive accumulation of separating fluid.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide the mounting of propeller blades with planetary gearing having forward and reverse control, blade rotating means operating through worm gearing from said planetary gearing, and pumps adapted for operation upon the putting into operation of said planetary gear, said pumps exerting, through hydraulic fluid columns, a force on the propeller blades opposite in sense to the centrifugal force resulting from propeller operation to relieve friction between thrust surfaces of said blades and their housing, and permit the operation of said planetary gearing to effect rotation of said blades in their housing. All of which is more particularly described and ascertained hereinafter, by way of example, having reference to the accompanying drawings, wherein:—

Figure 9 is drawn to a smaller scale than Figures 5 and 6, and Figures 5 and 6 are drawn to a smaller scale than the remaining figures of the drawings.

Similar characters of reference indicate similar parts in the several figures of the drawings.

1 is a shaft, such as the crankshaft of an engine, rotatable in a stationary structure 2 and having secured thereon a propeller hub or housing, comprising front and rear shells 3 and 4 bolted together at 5, the rear shell being splined to the crankshaft at 6. 7 indicates the bosses of propeller blades, which bosses are housed in the said hub and provided with thrust shoulders 8 engaging complementary shoulders 9 within the propeller hub. The inner ends of the bosses are spaced as at 10, the annular internal webs 11 shown in this example within the propeller hub.

Rigidly secured to the inner end of each blade boss by a coaxial plug or bolt 12 and dowel pin $12^a$ is a cylinder 13, both of which cylinders have bevel toothed quadrants 14 thereon approximate to their inner ends, which quadrants are geared together by a ring gear 15 rotatable about the axis of the crankshaft in an annular recess 16 in the forward member 3 of the propeller hub.

One of the said cylinders 13 is also indicated as having a projecting portion 17 thereon cut in the form of a worm gear and engaged by the worm 18 of a worm shaft 19. This shaft is tubular and is mounted on a spindle 20, the ends of which are secured in supports 21, which in turn are secured within the rear propeller hub shell by bolts 22. The extremities of the worm shaft 19 are formed with bevelled thrust shoulders 23 having rolling contact with bevelled thrust collars 24 carried by members 21, thereby ensuring free rotation of the worm shaft under operating conditions.

The rear member 4 of the propeller hub is extended into an integral flange 25 to which is secured a ring member 26 having a ball race 27 mounted therein and housing an internal ring gear 28 riding on balls 29 within the said race 27. This ring gear meshes with a pinion 30, which in turn meshes with a spur gear 31 rotatable on balls 32 about an inner race 33 carried by the splined portion of the propeller hub. The gear 31 carries a scroll gear 34 which meshes with the worm 18, the thread of the worm being cut as at 35 in a manner complementary to the thread scroll for that purpose. The said scroll gear is capable of a certain lost motion in its supporting gear 31, which motion is limited in both directions of rotation by the projection $34^a$ carried by the scroll gear and the stop $31^a$ within the gear 31.

The internal gear 28 is provided with a rearwardly extending brake drum 36, and the spur gear 31 is also provided with a rearwardly extending brake drum 37, the said drums 36 and 37 being spaced apart to accommodate movable brake shoes 38, which are hingedly secured at their lower ends by pins 39 to the stationary structure 2: 40 being a retaining block also secured to the said stationary structure and engaging adjacent of the said brake shoes 38 to prevent their slipping from the pins 39. The free ends of the brake shoes are connected by draw links 41 with a rocking brake operating member 42 mounted in the said stationary structure and provided with an operating lever 43. The member 42 is provided with a spring pressed stop 44 adapted to enter a recess 45 in the stationary structure when the brakes are held in a neutral position by their operating member, so that undesired displacement of brakes will be prevented.

It will be obvious that the rotation of the said member 42 in one or other direction will cause the brake shoes 38 to either contract upon the drum 37 of the gear 31 or to expand against the drum 36 of the gear 28, thereby locking one or other of these gears to the stationary structure. It will also be apparent that by so locking the gear 31 against rotation with the propeller the worm 18 will travel around the scroll and be rotated thereby around the axis of the worm shaft, and consequently impart a rotary movement to the cylinder 13, geared thereto, in one direction. In other words, a virtually opposite relative rotation is given the scroll to the propeller, which results in a rotation of the propeller blades on their axes by reason of the worm gearing of the cylinders 13 and the coupling of the cylinders 13 together by the ring gear 15.

It will also be apparent that the locking of the gear 28 against rotation with the propeller, by effecting the expansion of the brake shoes 38 against the drum 36 of the said gear 28, will produce the opposite rotation of the cylinders 13 to that just described by reason of the planetary movement of the pinion 30 within the internal ring gear 28, which results in the rotation of the scroll gear 34 in the direction of the propeller rotation but at a greater speed as will be well understood by those conversant with the gear art without further detail or explanation. Consequently, the operation of the lever 43 in one or other direction results in a selection of the required gear trains to effect rotation of the propeller blades in one or other direction about their axes for the varying of the pitch thereof.

Thus far, the invention involves more or less ordinary problems of gearing to effect the transmission of pitch varying rotary motion from the crankshaft to the blades of the propeller, but as such propellers are usually of considerable diameter and weight and are operated at high speed, the effect of centrifugal force on the blades must be contended with. In aerial propellers this centrifugal force on the blades commonly runs as high as 50,000 to 60,000 pounds, and is exerted on thrust collars or bearings such as the shoulders 9 of the propeller hub illustrated. Obviously, the resultant friction would preclude rotation of the blades by an ordinary gearing means were not provision made for relieving this friction.

In Figures 1 to 7, I have illustrated a very simple and effective means of relieving this friction. As has already been stated the scroll gear 34 has a lost motion support in the gear 31, the lost motion being limited to somewhat less than one revolution of the gear 31 by the stops 31ª and 34ª, so that upon the relative rotation of the said gear 31 to the scroll gear 34 in one or other direction, following the setting of the brake shoes 38, the scroll gear 34 will not come into operation for the rotation of the cylinders 13 until a relative rotation of the gear 31 to the scroll gear 34 of practically one revolution has taken place. Consequently, by virtue of its meshing with the said gear 31, the pinion 30 will be rotated a number of times before the scroll gear is brought into blade moving operation. The interim operation of the pinion 30 is transmitted through a spindle 46 and bevel gearing 47 mounted in the hub structure of the propeller to a cam 48 which, in turn, operates spring pressed pump plungers 49 having small displacement and carried by pump cylinders 50, the outer ends of each of which pump cylinders open into a chamber 51 of a fixed crosshead 52 within the propeller hub, each crosshead passing through a clearance opening 53 in each cylinder 13. The clearance of the said openings is sufficient to permit both rotary and reciprocating movements of the said cylinders relative to the crossheads 52.

The cylinders 50 operate as posts together with posts 54 on the opposite ends of the crossheads 52 to support cross pieces or yokes 55 suitably shaped to clear the crankshaft 1 and passing beneath the inner ends of the cylinders 13.

In each cylinder 13 is a stationary piston 56 which is secured to the crosshead 52 by a hollow screw 57, and each of the said pistons is chambered to provide an oil reservoir 58 which communicates with the chamber 51 of its crosshead by way of a check valve 59 opening thereinto, but normally closed by the action of a valve spring 60. 61 is a balance lever pivoted at 62 to an arm within the oil reservoir 58 and provided with a weighted portion 63 which operates under the influence of centrifugal force when the propeller is rotating to balance the effect of centrifugal force on the check valve 59 by virtue of the connection of the unweighted end of the said lever 61 with a collar 64 carried by the stem of the said check valve.

As a result of the described arrangement, the chamber 51 of the crosshead operates as a pump chamber under the influence of reciprocation of the plunger 49 by the cam 48, the check valve 59 actuating as the inlet valve of the said pump chamber; the discharge from the pump chamber is through the hollow piston bolt 57, which bolt carries a non-return check valve 65 therewithin permitting flow from the pump into a chamber 66 of the cylinder 13, and preventing its return to the pump chamber 51 of the crosshead.

It will be readily seen that frequent operation of the plunger 49 will result in a corresponding series of jets of oil being pumped from the reservoir 58 to the cylinder chamber 66 and, as oil is incompressible, this will result in movement of the cylinder head 67 away from the piston and result in a corresponding movement of the shoulder 8 of the propeller blade boss from contact with the shoulder 9 of the propeller housing, the principle being that of a hydraulic jack which is capable of producing extremely high pressures, well able to offset the thrust effect of centrifugal force on the shoulder 8 of the propeller blade. All the blades of the propeller are similarly equipped so that they are subjected to the same hydraulic thrust relieving action upon the operation of the cam 48.

It has already been stated that the operation of the cam 48 takes place as a result of the operation of the brake shoes 38 in one or other direction, and that this operation of the said cam may take place before the scroll gear is operated, due to the lost motion mounting thereof previously described, so it is seen that, as a consequence, the jacking of the propeller blades from frictional contact with the thrust shoulders of the housing or from such other thrust means as may happen to be provided will take place before the said scroll gear commences to operate the worm 18 and effect a rotation of the cylinders 13. This ensures the propeller blades being free to rotate under such influence and permit the gearing to operate under conditions favorable to such operation.

The time lag between the commencement of the pump operation and the commencement of the cylinder rotation is a matter of precaution and may be arranged in its extent to meet whatever requirements may be called for, as, for example, where sufficient back-lash or elasticity in the cylinder rotating gearing is available or desirable, the time lapse between the commencement of pump operation and the commencement of cylinder-rotating gear operation may be reduced to a minimum.

As a safety measure to prevent over-jacking of the propeller blades, I have illustrated a relief valve 68 one of which is located in each crosshead to normally shut off communication between the pump chamber 51 and a relief passage 69 which returns to the oil reservoir 58, this valve 68 being maintained by a rod 70 slidable in the post 54 and pressed against the relief valve by a spring 71 of sufficient strength to prevent the opening of the said valve by direct pressure of oil in the pump chamber 51. Each yoke 55, however, has a tappet 72 slidably mounted therein between the cylinder head 67 and an adjustable stop 73 carried by an arm 74 hinged to a lug 75 on the said yoke. The free end of the said arm engages a cotter 76 on the end of the relief valve rod 70, and is adapted to move the said rod against the resistance of the spring 71 when the tappet 72 is moved by the cylinder head 67.

The adjustment of the stop 73 determines the point at which the arm 74 will be moved under the influence of the cylinder movement, and this may be regulated to suit the required propeller blade relief, which in most cases is around one or two thousandths of an inch. When the relief valve 68 is so opened, no further jacking of the propeller blade will take place, as the plunger 49 will then merely operate to circulate oil through the chamber 51 back into the reservoir.

Figure 1:
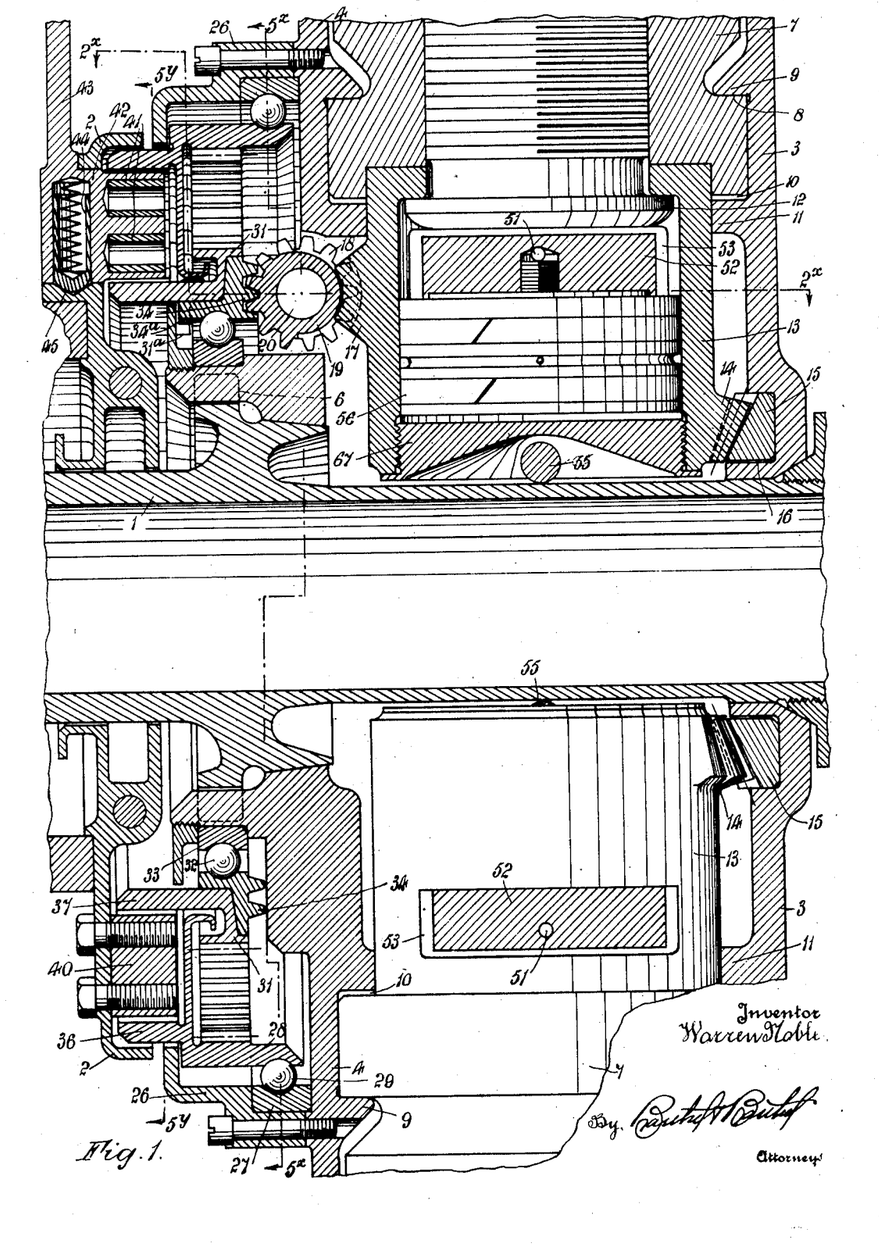
Figure 1 is a longitudinal section of a propeller hub and mounting, illustrating an embodiment of the said invention, the lower propeller boss being shown in elevation to save unnecessary duplication of detail.
Figures 2, 7:
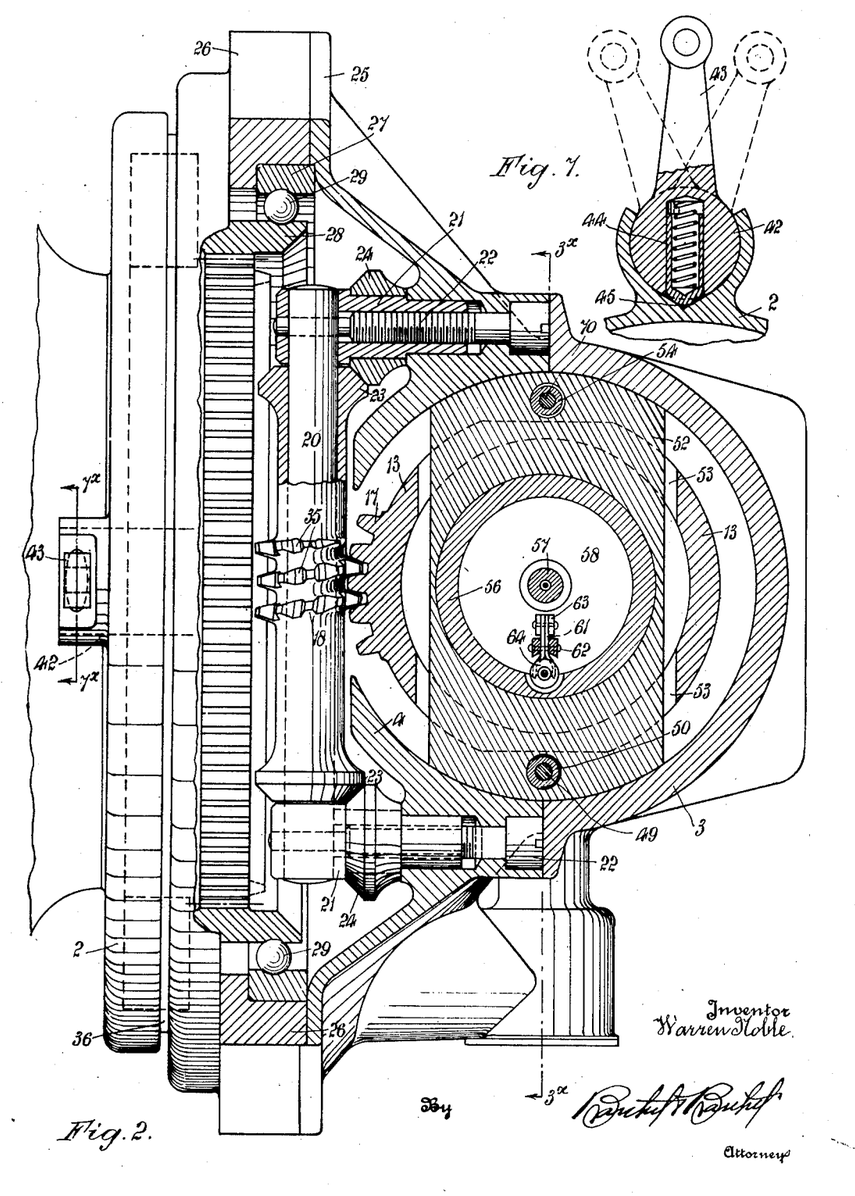
Figure 2 is a sectional plan of the same, the section being taken on the line $2^x$—$2^x$ of Figure 1.
Figure 7 is a fragmentary sectional detail view taken on the line $7^x$—$7^x$ of Figure 2.
Figure 3:
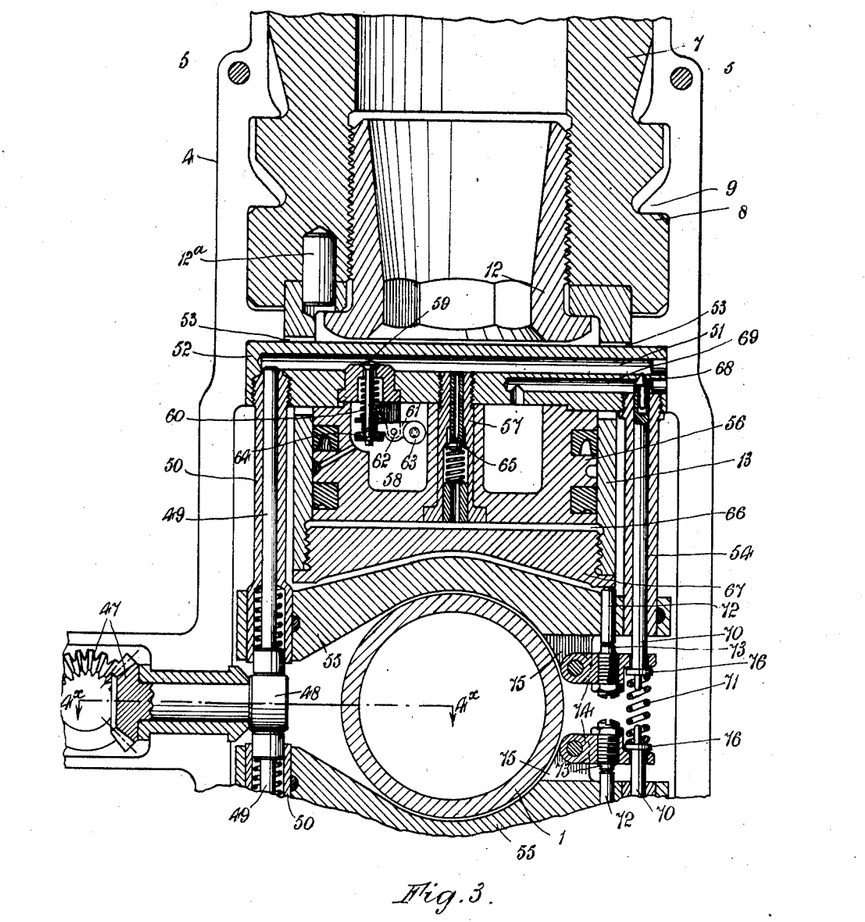
Figure 3 is a fragmentary detail transverse section taken on the line $3^x$—$3^x$ of Figure 2.
Figures 4, 9:
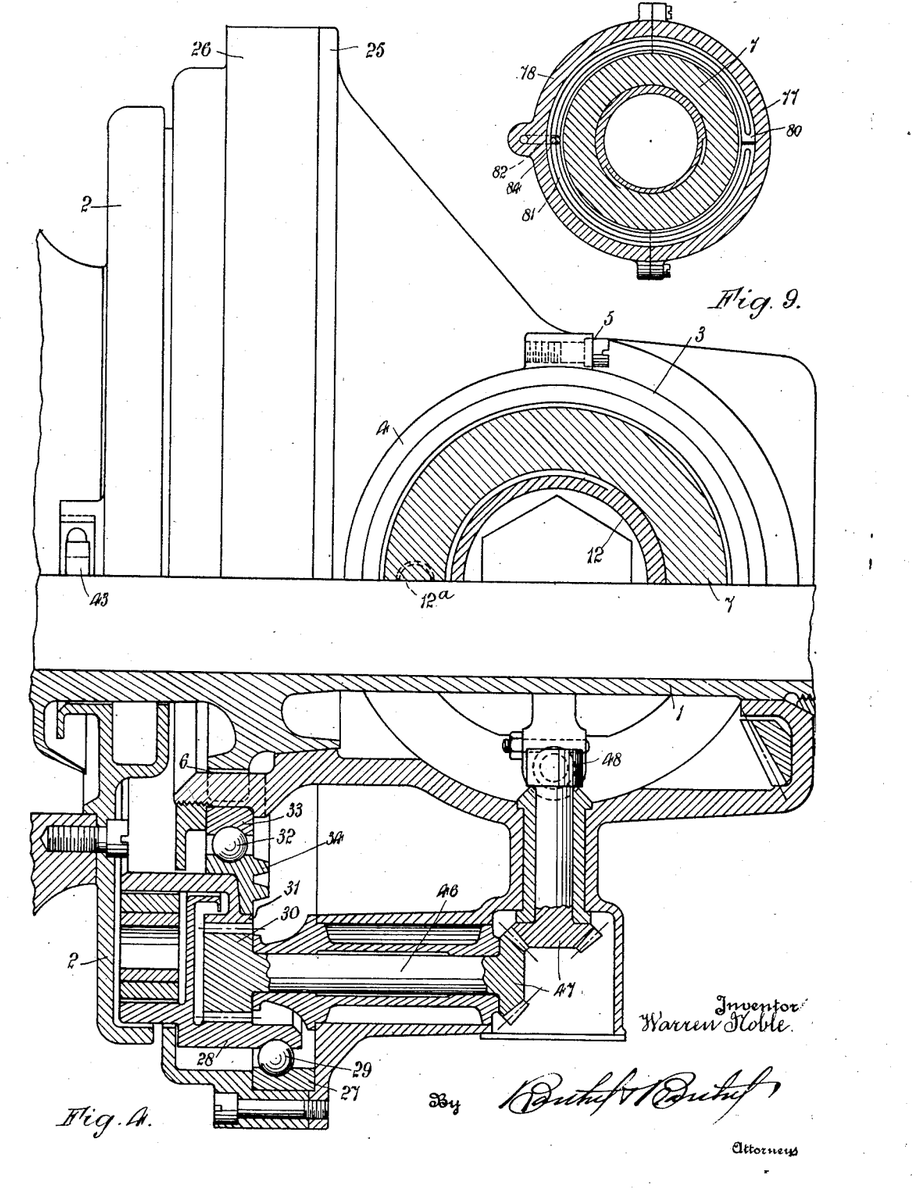
Figure 4 is a plan of the propeller hub and mounting, the lower half of the figure being shown in section taken on the line $4^x$—$4^x$ of Figure 3.
Figure 9 is a detail sectional view of the same taken on the line $9^x$—$9^x$ of Figure 8.
Figures 5, 6:
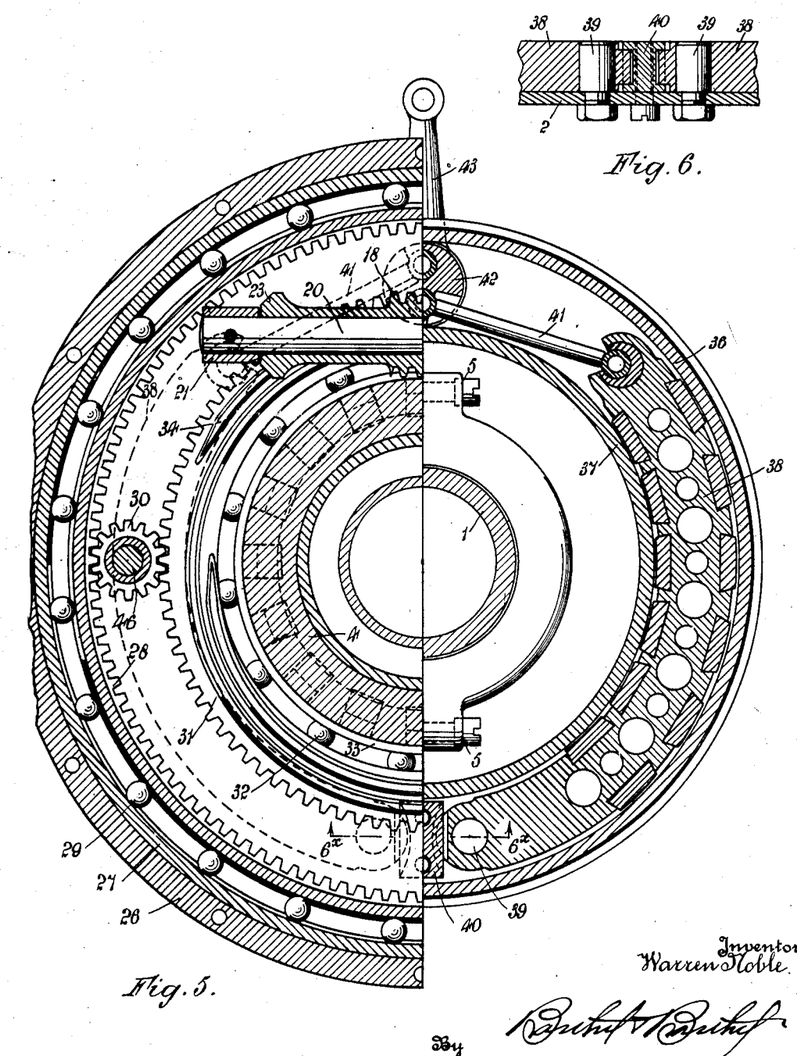
Figure 5 is a transverse sectional detail view, the left hand side of the figure being taken on a plane indicated by the line $5^x$—$5^x$ of Figure 1, and the right hand side of the figure being taken on a plane indicated by the line $5^y$—$5^y$ of Figure 1.
Figure 6 is a fragmentary sectional detail view taken on the line $6^x$—$6^x$ of Figure 5.
Figure 8:
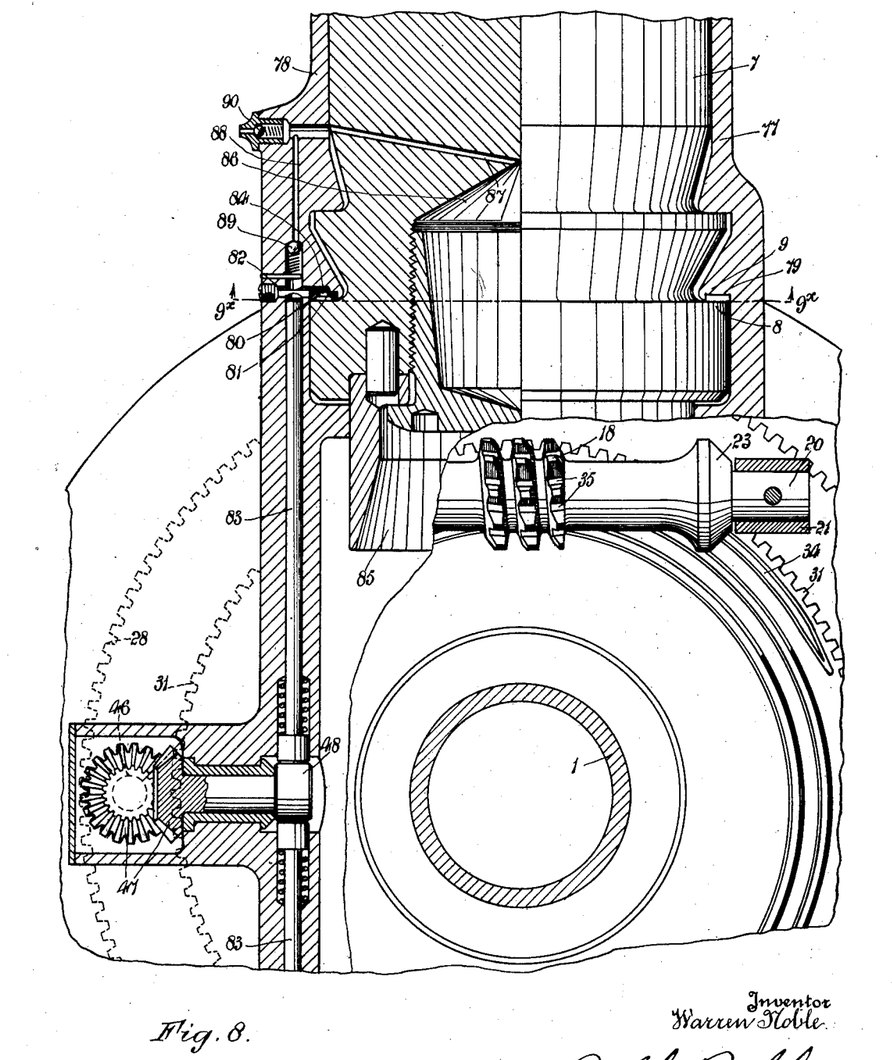
Figure 8 is a fragmentary sectional elevation, illustrating a modified form of the device.

In the modified arrangement shown in Figures 8 and 9, the principle of bearing relief disclosed in my co-pending application Serial Number 174,296, filed March 10, 1927, is involved as a means of compensating for the effect of centrifugal force in the blades in order to permit rotation thereof in a manner already described; and in the said Figures 8 and 9 the propeller hub comprises two shells 77 and 78 provided with the thrust shoulder 9 against which the shoulder 8 of the propeller boss abuts normally, the shoulder 9 being recessed at 79 to accommodate a split annulus 80 having a channel 81 therein opposed to the shoulder 8 of the propeller boss. The hub shell 78 is drilled at 82 to form a chamber to which the end of a plunger 83 is exposed, the said chamber 82 communicating with the channel 81 of the annulus by way of an orifice 84 in the said annulus.

Next to the inner end of the propeller boss is a cylinder or skirt 85 adapted to be operated by the worm 18 and scroll gear 34 in the manner already described with reference to Figures 1 to 7, the particular details of this drive not being duplicated in Figures 8 and 9 for the sake of simplicity.

The cam 48 operates the plunger 83 of each propeller blade at high frequency so that impulses are imposed on a body of oil trapped in the chamber 82, and in the channel 81 of the annulus 80, the said impulses being thereby directed hydraulically against the face of the thrust shoulder 8 of the propeller blade 7 in a vibratory manner which sufficiently relieves metallic contact with the shoulders 8 and 9 to permit the movement of the propeller blade by the gearing provided for that purpose.

The said arrangement provides a form of hydraulic gasket between the thrust faces 8 and 9, which is subjected to intermittent impulses of the plunger 83, which, though of short duration, are quite violent and effective for the purposes stated.

To provide for oil supply to the chamber 82, a reservoir 86 is formed within the propeller boss and a passage 87 from the outer end of the reservoir communicates with a passage 88 leading to the chamber 82 normally closed by spring pressed check valve 89. 90 is a valved inlet device through which the reservoir may be filled. When the propeller is operating, centrifugal force will throw the oil in the reservoir outwardly and consequently fill the passages 87 and 88 so that, in case of shortage of oil in the chamber 82, the plunger 83 will draw oil past the check valve 89 into the said chamber 82 when the said plunger is operated and thereby supply the deficiency.

By utilizing hydraulic means for relieving thrust of the propeller blades as an auxiliary to gearing for effecting the rotation of the blades, the problem of securing variable pitch in a propeller is greatly simplified and rendered practical in its application to high speed propellers such as are utilized in connection with aircraft. Furthermore, the controlling of the hydraulic relief and the blade rotating mechanism by means common to both provides a simple arrangement which is self-guarding against overstrain of the blade rotating mechanism.

Many of the advantages which will accrue from adequate control of blade pitch in propellers are already well realized by those conversant with the propeller art, so that they do not need to be dwelt on herein, and the present invention does not detract from many of these advantages but, on the contrary, makes them available to a high degree.

This invention may be developed within the scope of the following claims without departing from the essential features of the said invention, and it is desired that the specification and drawings be read as being merely illustrative and not in a limiting sense, except as necessitated by the prior art.

What I claim is:—

1. In a variable pitch propeller means for applying to each blade a force opposite in sense to its centrifugal component, said means comprising a hydraulic pump actuating against each blade in a direction opposite to its centrifugal component, and pump operating mechanism.

2. In a variable pitch propeller, a hub having a member with a surface presented towards the axis of said propeller, blades each having a member with a surface opposed to the said surface of said hub member, a hydraulic pump adapted to exert pressure on the said opposed surfaces for their separation, pump operating mechanism, and means for rotating said blades on their axes during said surface separation.

3. In a variable pitch propeller, a hub, a propeller blade having a thrust abutment in said hub, a member on said blade movable in the direction of its axis towards the axis of said propeller, a fixed member on said hub co-operating with said blade member to form a hydraulic receiver, a pump discharging into said receiver and operating as a hydraulic jack for said blade to relieve centrifugal thrust on said abutment, pump operating mechanism, and means for rotating said blades while under the relieving influence of said hydraulic jack.

4. In a propeller, in combination, a hub, a propeller blade having a thrust abutment in said hub, blade-rotating means, and a hydraulic jack operating against said blade in a direction opposed to its centrifugal component to relieve said thrust abutment and permit the rotation of said blade by said rotating means when said propeller is in operation.

5. In a propeller, in combination, a hub, a propeller blade having a thrust abutment in said hub, blade-rotating means, and a hydraulic jack, housed in said hub, operating against said blade in a direction opposed to its centrifugal component to relieve said thrust abutment and permit the rotation of said blade by said rotating means when said propeller is in operation.

6. In a propeller, in combination, a stationary member, a hub, a propeller blade having a thrust abutment in said hub, blade-rotating means, a hydraulic jack operating against said blade to relieve said thrust abutment from the effect of centrifugal force when the propeller is in operation, means for connecting said hydraulic jack with said stationary member at will to effect the operation of said jack during propeller operation, and means for connecting said blade-rotating means with said stationary member to effect the rotation of said blades after the relief of said thrust abutment by said hydraulic jack.

7. In a propeller, in combination, a hub, a propeller blade having a thrust abutment in said hub, a hydraulic jack operating against said blade in a direction opposed to its centrifugal component to relieve said thrust abutment, and lost-motion blade-rotating gearing operably coupled with said hydraulic jack for the operation of said jack and delayed rotation of said blade.

8. In a variable pitch propeller, the combination with an operating engine, means operable by said engine for applying to each blade a force opposite in sense to its centrifugal component, blade rotating mechanism, and means controlling the combined operation of said means and said mechanism.

9. In combination with an engine, a variable pitch propeller including means for applying to each blade of the propeller a force opposite in sense to its centrifugal component, said means comprising a hydraulic pump actuating against each blade in a direction opposite to the centrifugal component, and means operatively connecting said pump with said engine.

10. In a variable pitch propeller, means for applying to each blade a force opposite in sense to its centrifugal component, blade rotating mechanism, and means for rendering said first mentioned means and said mechanism active for combined operation during propeller rotation.

11. In a power operated variable pitch propeller, a hub having a member with a surface presented towards the axis of said propeller, blades each having a member with a surface opposed to said surface of said hub member, means adapted to separate said opposed surfaces, said means being actuated by power operating said propeller, and means for rotating said blades on their axes during the said surface separation.

12. In a propeller, in combination, a hub, a propeller blade having a thrust abutment in said hub, blade rotating means, a pressure device operating against said blade in a direction opposed to its centrifugal component to relieve said thrust abutment and permit rotation of said blade by said rotating means when said propeller is in rotation, said pressure device receiving its power from the same source as the propeller.

13. In a propeller, in combination, a hub, a propeller blade having a thrust abutment in said hub, blade rotating means, a pressure device operating against said blade to relieve said thrust abutment from the effect of centrifugal force when the propeller is in operation, means for operating said pressure device at will during propeller operation, and means connecting said blade rotating means with said stationary member to effect the rotation of said blades after the relief of said thrust abutment by said pressure device.

14. In a propeller, in combination, a hub, a propeller blade having a thrust abutment in said hub, means operating against said blade in a direction opposed to its centrifugal component to relieve said thrust abutment, and lost motion blade rotating gearing operably coupled with said means to provide delayed rotation of said blade when said means is brought into operation.

In testimony whereof I affix my signature.

WARREN NOBLE.